(12) United States Patent
Traore et al.

(10) Patent No.: US 8,024,793 B2
(45) Date of Patent: Sep. 20, 2011

(54) PASSWORD GENERATOR, SYSTEM AND USE THEREOF

(75) Inventors: Issa Traore, Victoria (CA); Ahmed Awad E. Ahmed, Victoria (CA)

(73) Assignee: University of Victoria Innovation and Development Corporation, Victoria, B.C. (CA)

( * ) Notice: Subject to any disclaimer, the term of this patent is extended or adjusted under 35 U.S.C. 154(b) by 873 days.

(21) Appl. No.: 12/016,946

(22) Filed: Jan. 18, 2008

(65) Prior Publication Data
US 2008/0216152 A1 Sep. 4, 2008

Related U.S. Application Data

(60) Provisional application No. 60/897,028, filed on Jan. 22, 2007.

(51) Int. Cl.
*G06F 7/04* (2006.01)
(52) U.S. Cl. ............................... 726/20; 726/9; 713/184

(58) Field of Classification Search .................. None
See application file for complete search history.

(56) References Cited

U.S. PATENT DOCUMENTS

| | | | |
|---|---|---|---|
| 2002/0046342 A1* | 4/2002 | Elteto et al. | 713/185 |
| 2004/0031856 A1 | 2/2004 | Atsmon et al. | |
| 2004/0064728 A1* | 4/2004 | Scheurich | 713/201 |
| 2004/0161111 A1* | 8/2004 | Sherman | 380/283 |
| 2006/0107063 A1* | 5/2006 | Fiske | 713/184 |
| 2006/0242698 A1 | 10/2006 | Inskeep et al. | |

* cited by examiner

*Primary Examiner* — David Pearson
(74) *Attorney, Agent, or Firm* — Klarquist Sparkman, LLP

(57) ABSTRACT

A password generator for use with a detector and a verifier in an encapsulated system is provided, as is a system for generating and verifying passwords. The password generator comprises a support, a sensor for detecting a signal from the detector, a data transmitter for transmitting binary data as pulses, a processor that is initialized by the verifier and that controls the data to be sent, a controller for activating the processor and a connector to releasably connect the password generator with the verifier. The system employs a mouse as the detector.

Figure 1:
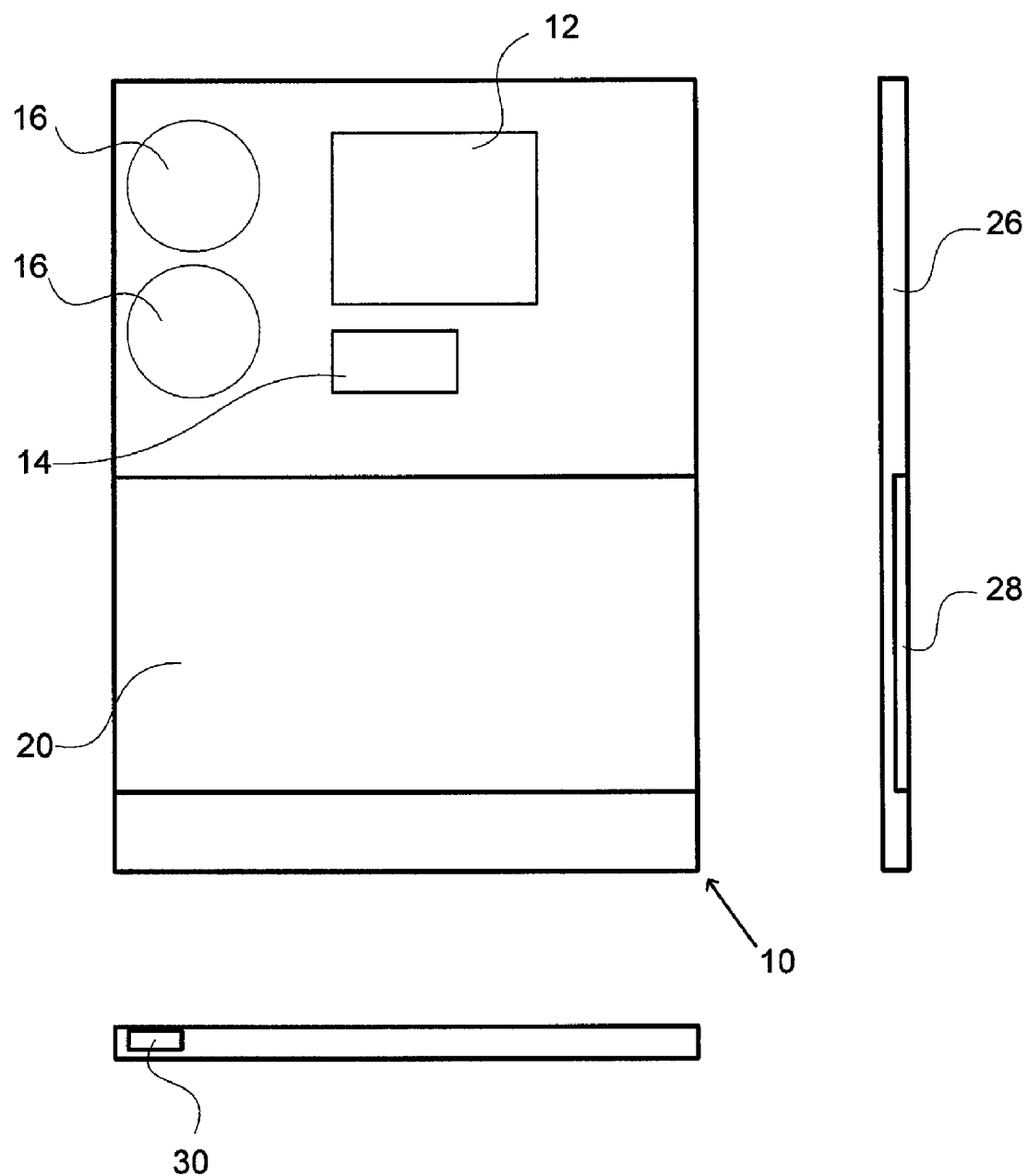

21 Claims, 5 Drawing Sheets

PASSWORD GENERATOR, SYSTEM AND USE THEREOF

CROSS REFERENCE TO RELATED APPLICATION

This application claims the benefit of U.S. Provisional Patent Application 60/897,028, filed Jan. 22, 2007, and incorporated herein by reference.

FIELD

The field of the disclosed technology relates to multifactor authentication for computer security. More specifically, the technology is a password generating card that generates passwords that can be read by a conventional mouse-based card reader.

BACKGROUND

Access codes or passwords are needed for many applications, ranging from bank transactions, to accessing computers, to making transactions over the web. Many of these codes are housed in "smart cards". There is a serious concern that the codes are not secure. As a result, many approaches have been taken to increase transactions security.

One approach to increasing access security is to generate a one-time password (OTP). In U.S. Patent Application No. 20060242698, a number is provided through a visual and/or audio display on the card to output the OTP to the user. The end user inputs the OTP to access the system on-line, telephonically or otherwise. Existing algorithms are used to generate the numbers. This approach can be inconvenient for users as they have to read or listen to the number and key it in accurately. Anyone can read or listen and copy the number.

In another approach, the user creates a two-factor password whenever the user logs on. The first factor is the user's personal identification number (PIN), which the user enters as the first part of the password. The user obtains the second factor from an electronic token, which displays a 6-digit number. The token is time-synchronized with the authentication server, and the number displayed on the token changes every minute. The user enters the 6-digit number displayed on the token as the second part of the password. This two-factor password improves the security, however, it suffers the same deficiencies as the single OTP.

U.S. patent application No. 20040031856 overcomes some of the deficiencies in the prior art by utilizing sound waves to transmit data between an electronic card and a computing device equipped with a sound card. This, when used as a multifactor authentication system permits data transmission, detection and decoding without a special reader and without human input. Security can be assured by storing identical sets of random numbers both on a memory unit in the card, and on the authentication server. However, this system can be subject to interference because it is an "open system." Sound waves can easily be intercepted and sabotaged without needing any physical presence in the room.

There remains a need for a simple, secure authentication system. It is an object of the present technology to overcome the deficiencies in the prior art.

SUMMARY

A password generator for use with a detector and a verifier in an encapsulated system is provided. The password generator comprises:

a support;
a sensor for detecting a signal from the detector;
a data transmitter for transmitting binary data as pulses;
a processor that is initialized by the verifier and that controls the data to be sent;
a controller for activating the processor; and
a connector to releasably connect the password generator with the verifier.

In one aspect the sensor is a light sensor.
In another aspect the data transmitter is selected from one of a light emitting diode, a plurality of light emitting diodes, an infrared emitter and an ultraviolet emitter.
In another aspect the data transmitter is a plurality of light emitting diodes.
In another aspect the data transmitter is a horizontal movement motor.
In another aspect the password generator is battery operated and wherein the password generator further comprises connectors for electrically connecting the batteries.
In another aspect the support is a card.
In another aspect the support is a stick.
In another aspect the support is a fob.
In another aspect the support is a token.
In another embodiment a system for generating and verifying a password is provided. The system comprises:

a password generator for generating a password in binary format, and encoding, and transmitting the password as pulses;
a detector for detecting the pulses and sending a signal; and
a verifier for receiving the signal, decoding the signal into a password and determining the authenticity of the password.

In one aspect the system is an encapsulated system.
In another aspect of the system, the sensor is a light sensor.
In another aspect of the system, the detector is a mouse.
In another aspect of the system, the password detector comprises:

a support;
a sensor for detecting a signal from the detector;
a data transmitter for transmitting data as suitably selected movement pulses;
a processor that is initialized by the verifier and that controls the data to be sent;
a controller for activating the processor; and
a connector to releasably connect the password generator with the verifier.

In another aspect of the system, the password generator comprises:

a support;
a sensor for detecting a signal from the detector;
a data transmitter for transmitting data as suitably selected light pulses;
a processor that is initialized by the verifier and that controls the data to be sent;
a controller for activating the processor; and
a connector to releasably connect the password generator with the verifier.

In another aspect of the system, the data transmitter is selected from one of a light emitting diode, a plurality of light emitting diodes, an infrared emitter and an ultraviolet emitter.

In another embodiment a method of generating and verifying a password is provided. The method comprises initializing a password generator, detecting a signal from a detector, producing a password in binary format, sending it to an encoder, transferring data as pulses, acquiring and decoding the data back into its binary format, and verifying the password.

In another embodiment a method of generating and verifying a password is provided. The method comprises initializing a password generator, detecting a signal from a detector, producing a password in binary format, sending it to an encoder, transferring data as pulses, acquiring and decoding the data back into its binary format, and verifying the password, wherein the method is effected by employing the system defined above.

In one aspect of the method the detecting comprises detecting a light signal.

In another aspect of the method, the pulses are light pulses.

In another aspect of the method, the pulses are horizontal motion pulses.

In one aspect of the method, the detector is a mouse.

FIGURES

FIG. 1. Plan views of a password generator card in accordance with the disclosed technology.

Figure 2:
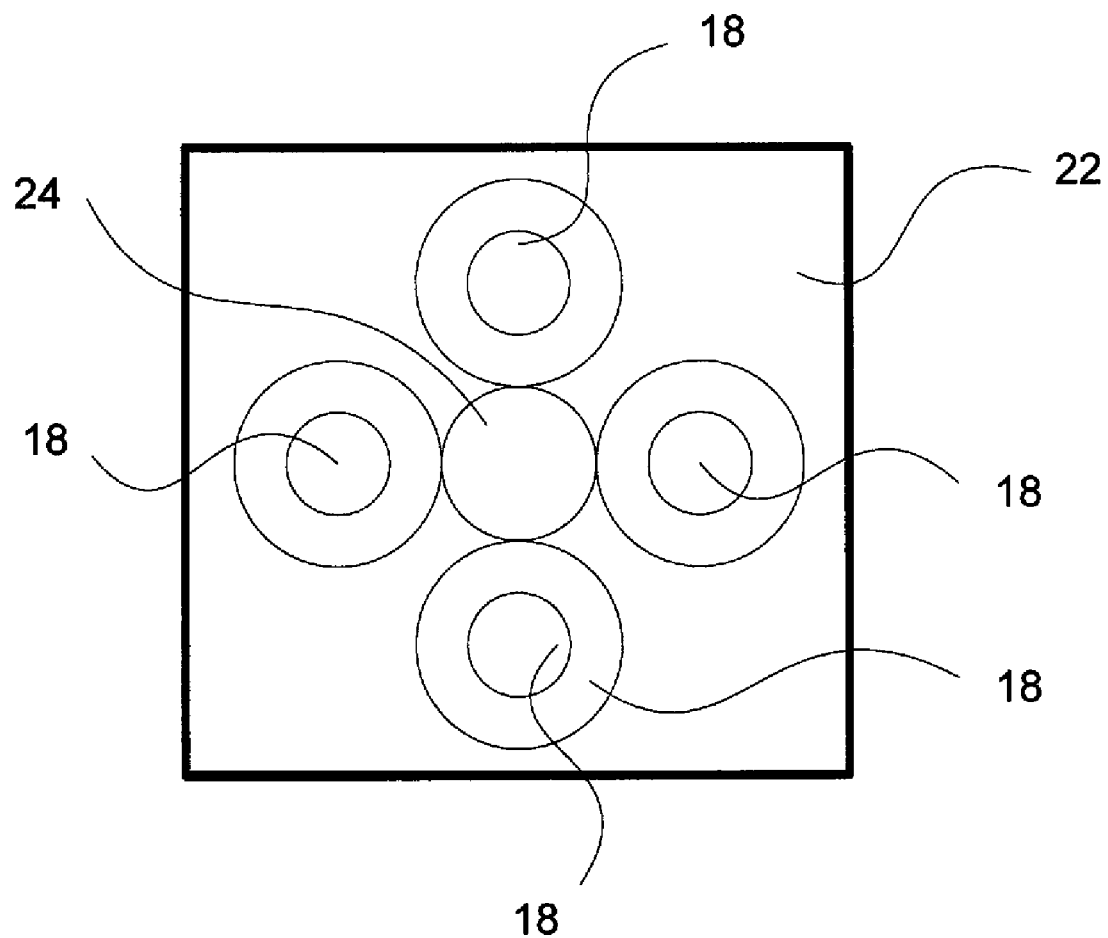

FIG. 2. System components of a first embodiment of the card of FIG. 1.

Figure 3:
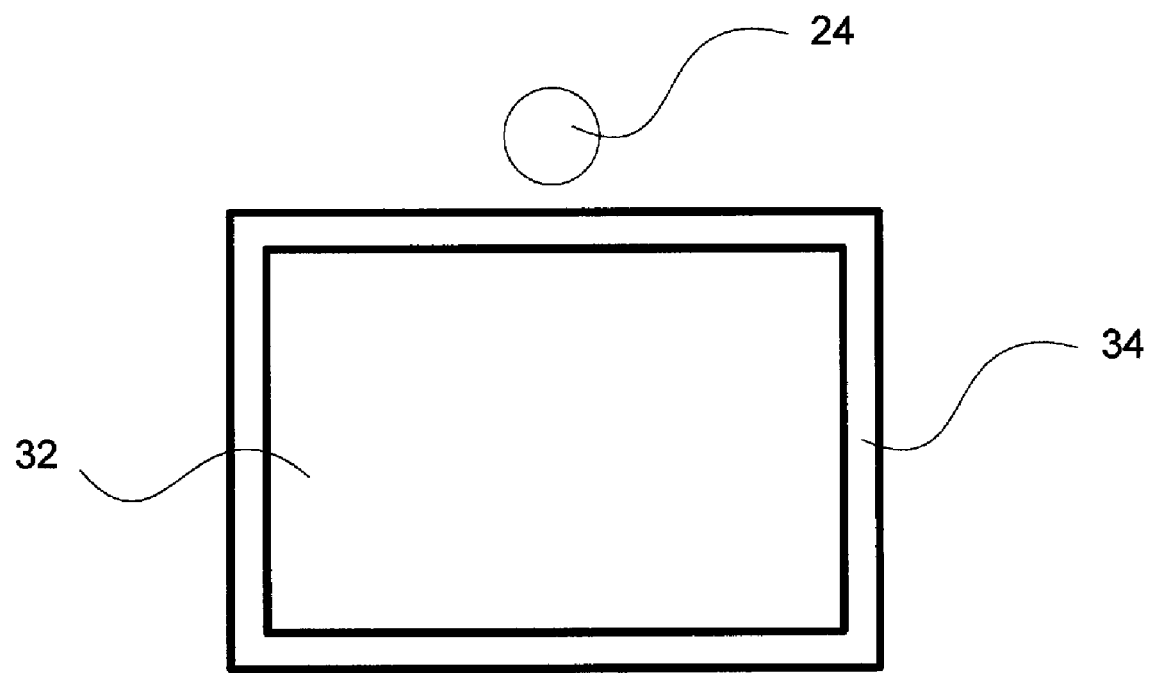

FIG. 3. System components of an alternative embodiment of the card of FIG. 1.

Figure 4:
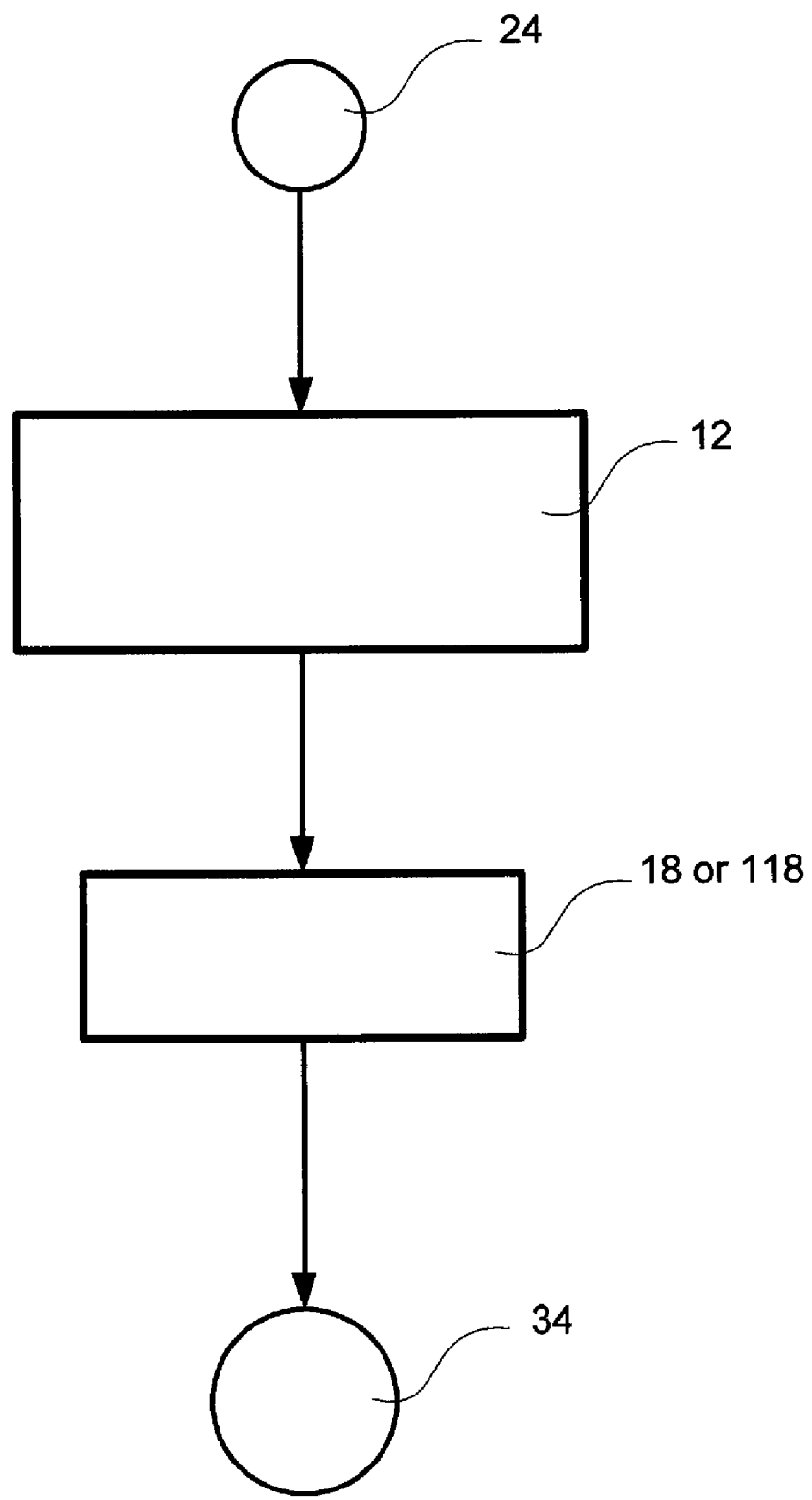

FIG. 4. System components and the flow of control.

Figure 5:
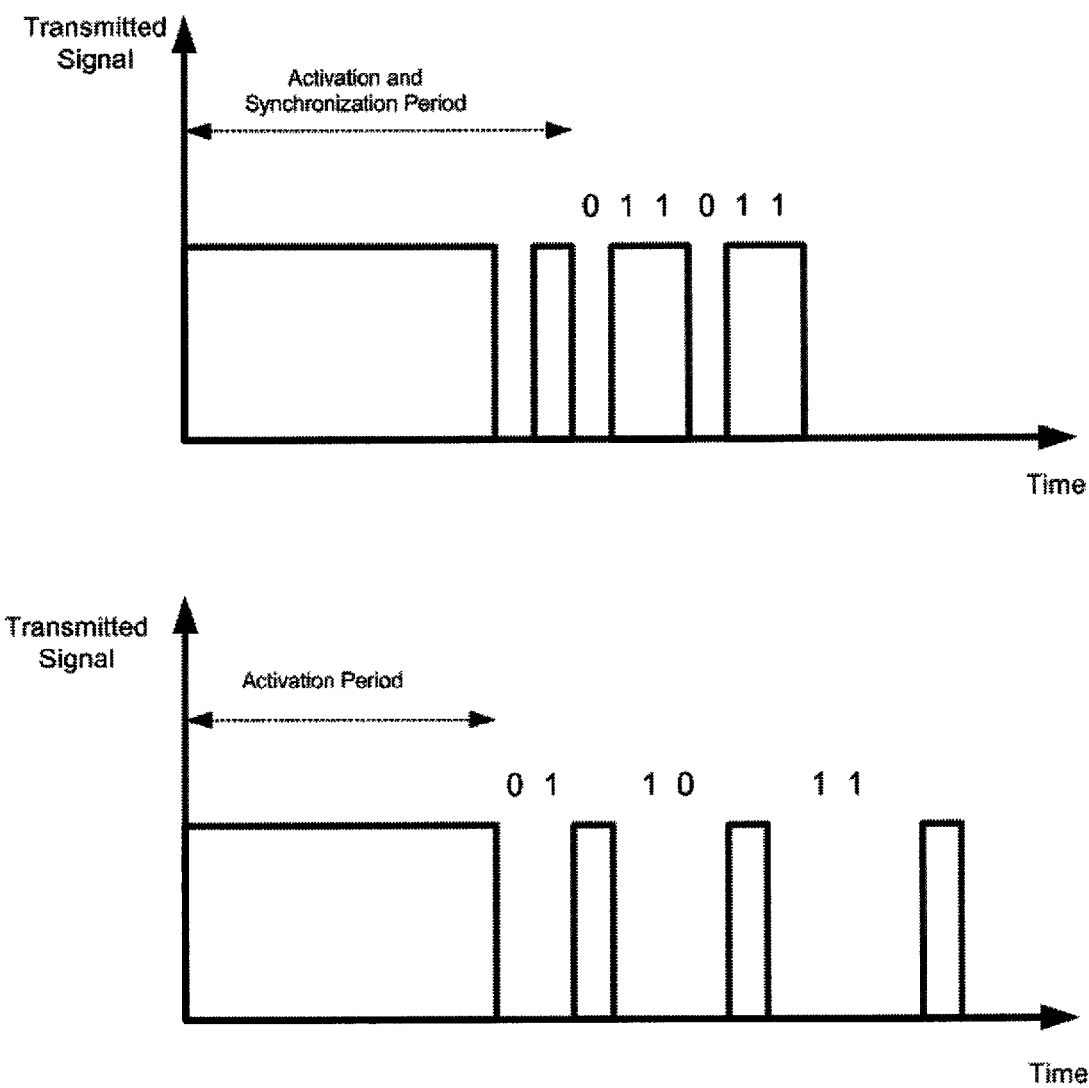

FIG. 5. Optical signal transmitted over time for the SFI and ALP algorithms transferring the same word.

DETAILED DESCRIPTION

Definitions

Data:
In the context of the present technology, data are sent as pulses of electromagnetic radiation, including infrared radiation, visible light, and ultraviolet radiation or as pulses of horizontal movement including vibration and oscillation.

Data Transmitter:
The data transmitter produces data pulses that can be detected by a data receiver. The data transmitter can be a card, a key fob, a token, a stick or any other support that has a power supply and an output device that is powered by the power supply. The data transmitter has a central processing unit and a controller.

Detector:
The detector consists of a data receiver selected to receive the selected pulses and a signal transmitter to send a signal to a verifier. The detector can be a mouse or a card reader, or any detector capable of receiving the data and transmitting a signal.

Verifier:
The verifier functions to decode the signal transmitted from the detector and permit access if the signal provided is correct. The verifier is typically housed in a computer and consists of a software module.

Encapsulated System:
An encapsulated system is a system that is not open, and is essentially closed without having the constraint of physical contact between the components. By way of example, a system utilizing audible sound would not be an encapsulated system.

Overview:
Optical and laser mouse devices are considered the latest and most common among the current available input devices in the market. The present technology utilizes the characteristics of these input devices and uses them to transmit data to the computer without altering its original functionality. The data sent can contain a secret password (optical password or key) and hence can be used to authenticate users in an access control process.

A credit card size device (i.e. smart card) is used to transmit the unique key stored in it to the computer when needed; this key is encoded by the card to a sequence of optical actions, horizontal movements or any other action that can simulate a number of mouse movements. A client software module, which resides on the computer, decodes the movements back to the original key. This technology can be used freely over the internet and is considered a good candidate as a second verification method enhancing the security of online transactions, and online banking sessions in general.

Two types of password systems can be implemented with this technology: a simple fixed password system and a variable password system where a new password will be generated every time the user uses the card. The card contains the logic needed to produce the passwords and the client module is able to verify it either locally or through a verification server. The current data transmission speed was found to be 1 bit/second.

The pulses are optical representation of the binary data being sent. The software reader (the decoder) decodes based on whether there is a mouse movement or not, which translates to a binary 1 or 0.

The system is referred to as an encapsulated system. Unless somebody
Is eavesdropping on the wire linking the mouse to the computer, the transmission cannot be intercepted.

System Architecture:
A password generator card, generally referred to as 10 is shown in FIG. 1. The credit card sized device has a central processing unit 12, which includes an encoder and carries the logic needed to produce the secret information to be transferred (e.g., one-time password) and a controller 14. The product is self-powered by coin batteries 16 that can power the product to produce a high number of passwords, for example, but not limited to at least 5000 passwords with MTBF≧3 years. As shown in FIG. 2, a number of light emitting diodes (LEDs) 18 are aligned on the card face 20 (as seen in FIG. 1) and are mounted on a reflective surface 22. The LEDs 18 are used to transfer the data to the computer through an optical or laser mouse. A light sensor 24 is centrally located on the card face 20, preferably central to the LEDs 18. Referring to FIG. 1, an external casing 26, that is transparent, or at the least, light transmissible on the transmitting surface 28, protects the card 10. A dib connector 30 is used to transfer the secret password to the card and to charge batteries if rechargeable batteries are used.

ALTERNATIVE EMBODIMENT

As shown in FIG. 3, an alternative embodiment utilizes a vibration motor 32 located on the card face 20 and covered with the external casing 26. The motor 32 is surrounded with a gap area 34 allowing it to move horizontally inside the card 10. Horizontal displacements generated by the vibration motor 32 will be detected by the mouse as movements representing the transmitted password.

FIG. 4 shows the system components and the flow of control. The process is triggered when the user places a mouse on the card face 20 and starts moving it. When the light produced from the mouse hits the light sensor 24 the central processing unit 12 produces the password in binary format and sends it to the encoder which will transfer the data to a pulse generator (produced by the high luminosity LEDs 18 or the horizontal motion motor 118). A detector 34 detects the pulses and a software client acquires the data by recording the pulses as mouse movements and silence periods and decodes the data back to its binary format. If the password matches the expected one then the user will be granted access to resources.

Activation Signal:

Optical mouse devices go into sleeping (power saving) mode when no movement is detected for a period of time. For some mouse device types this period can be as short as 5 seconds. During this period the light emitted from the mouse gets dimmed and the mouse becomes less responsive until it gets activated again by movement. Our experimental results show that a large amount of data transferred during this period gets lost. In contrast, when the mouse is in its active mode the data can be transferred with no loss. Based on this observation, we came to the conclusion that the mouse should be activated properly before starting transferring data; this can be achieved by sending a large number of optical pulses for a period of time.

Activation Signal for Alternative Embodiment:

Mouse devices go into sleeping (power saving) mode when no movement is detected for a period of time. For some mouse device types this period can be as short as 5 seconds. During this period the mouse becomes less responsive until it gets activated again by movement. Our experimental results show that a large amount of data transferred during this period gets lost. In contrast, when the mouse is in its active mode the data can be transferred with no loss. Based on this observation, we came to the conclusion that the mouse should be activated properly before starting transferring data; this can be achieved by sending a large number of horizontal actions for a period of time.

Password Generation:

The card stores either a fixed password or generates a one-time password. With a fixed password scheme, a hashed version of the password is also stored on the host. For a one-time password, the password is generated recursively using a one-way hash function. The same scheme is used on the host side to generate a matching password.

To login, the user places his card under the mouse and moves the mouse slightly to initialize the process. Then the card transmits the password to the computer via the mouse. The password, either fixed or one-time, is transmitted in hashed form. Verification is done on the host by comparing the received password with the stored or generated one.

In the present technology the hash function and the logic to generate the passwords are implemented in the card. The card is initialized by also generating and storing (in it) a random number (which can be reinitialized).

Asynchronous Leading Pulse Algorithm (ALP):

In this protocol, an optical pulse or horizontal movement is used to indicate the start of a binary word; the word is encoded using a consecutive sequence of silence intervals. For example, for a 2 bits word the four possible alternatives (00, 01, 10, and 11) can be represented with 1, 2, 3, 4 consecutive silence periods, respectively. Another pulse or horizontal movement is needed to indicate the end of the binary word which can be the leading pulse for the next word or the message termination pulse. The software decoding module looks for silence periods following the activation signal, and then decodes those silence periods back to binary words based on each period's length.

Synchronous Fixed Time Interval Algorithm (SFI):

In this protocol optical pulses or horizontal movement and silence periods are mapped directly to binary representations. An optical pulse with the shortest possible duration indicates a binary value 1 and a silence period with the same duration indicates the binary value 0.

If the transferred binary word contains a large number of consecutive zeros the mouse device can enter into the power saving mode and will miss a number of the following bits as it requires an activation signal to get back to the normal mode. In order to avoid this situation, the binary word transferred by this protocol shouldn't contain any consecutive zeros with duration greater than the maximum allowed silence period.

The effect of this restriction on the total number of possible words is not significant. If the possible number of words transferred using n bits is $N=2^n$ then the total number of words is $$N_{SFI} = 2^n - \sum_{i=1}^{n-x+1} i,$$

where x is the maximum number of consecutive zeros which can be sent before the mouse device enters the power saving mode.

EXAMPLE 1

Comparing the Two Algorithms

FIG. 5 show the signal transmitted over time for the two algorithms when used to transmit the same binary word (011011 in this case). For this particular case we can notice that the SFI algorithm is faster in transmitting the signal while the ALP algorithm consumes less power. Table 1 shows the average time needed to transmit 1 bit and the average power consumed in this transfer for four possible variations of the ALP algorithm. In Table 2, we compare those factors for the 2 bit and 3 bit ALP algorithm, and the SFI algorithm when transferring a binary word of 18 bit length and more. From the table we can notice that the performance of the ALP2 and SFI algorithms in terms of power consumption is comparable, while ALP3 consumes less power for the price of the data transfer speed. On the other hand the SFI algorithm is superior to the ALP algorithm in terms of data transfer speed, which was found to be not improving for any of the ALP variations.

TABLE 1

Comparing the speed and power consumption for four possible ALP configurations

| Bits transferred per word | Time slots needed to transfer a word | | Average time per bit $t_{ave}$ | Average power per bit $P_{ave}$ |
|---|---|---|---|---|
| | Min | Max | | |
| 1 (ALP1) | 2 | 3 | | |
| 2 (ALP2) | 2 | 5 | | |
| 3 (ALP3) | 2 | 9 | | |
| 4 (ALP4) | 2 | 17 | | |

TABLE 2

Comparing the performance of SF1 and ALP algorithms for 18 to 36 bit binary words

| Bits transferred | SFI | | ALP2 | | ALP3 | |
|---|---|---|---|---|---|---|
| | $t_{ave}$ | $P_{ave}$ | $t_{ave}$ | $P_{ave}$ | $t_{ave}$ | $P_{ave}$ |
| 18 | | | | | | |
| 24 | | | | | | |
| 30 | | | | | | |
| 36 | | | | | | |

The foregoing is a description of embodiments of the present technology. As would be known to one skilled in the art, variations that do not alter the scope of the technology are contemplated. For example, the card need not be a card. It could for example be a key fob, a token, a stick or any other support. The controller may be any suitably selected controller, for example, but not limited to a switch. Also, for example, the detector may have any receiver selected to be able to detect the data from the password generator, for example, in the case of infrared data, an infrared detector. Data may be any suitably selected light or any suitably selected, detectable movement. The vibration motor may be any horizontal movement or motion motor. Further advances in detectors, notably the computer mouse, may permit the use of new forms of data—the constraint being that the data can be decoded to provide a binary signal and that it allows for an encapsulated system. The verifier simply functions to initialize the card and decode a signal sent from the detector and therefore is a software module.

We claim:

1. A system for generating and verifying a password, comprising:
   a password generator for generating a password in binary format, and encoding, and transmitting the password as pulses;
   an optical mouse coupled to a computer system, the optical mouse including a detector situated so as to detect the pulses and produce a signal associated with the password and communicate the signal to the computer system as mouse movement data; and
   a verifier for receiving the signal at the computer system, decoding the signal to obtain a password, and determining the authenticity of the password.

2. The system of claim 1 wherein the system is an encapsulated system.

3. The system of claim 2 wherein the detector is a light sensor.

4. The system of claim 2 wherein the password generator includes a light emitter configured to transmit the password as light pulses.

5. The system of claim 4, wherein the password generator comprises a vibration motor configured to transmit the password as a series of displacements.

6. The system of claim 1, wherein the password generator is a password generator card that comprises:
   a card face; and
   a transmitter configured to transmit the password from the card face to the optical mouse.

7. The system of claim 6 wherein the data transmitter is selected from one of a vibration motor, a light emitting diode, and a plurality of light emitting diodes.

8. An authentication method for authorizing access to a computer system, the method comprising:
   situating an optical mouse at a card face of a password generator, the optical mouse coupled to the computer system so as to serve as a user input device associated with cursor movement;
   communicating a password to the optical mouse from the card face;
   transmitting the communicated password to the computer system from the optical mouse as mouse movement data; and
   decoding mouse movement data at the computer system so as to obtain the password.

9. The method of claim 8, wherein the password is communicated to the optical mouse from the password generator as a series of light pulses.

10. The method of claim 9, wherein the series of light pulses is received at an optical detector of the optical mouse, wherein the optical detector is configured to detect mouse movement.

11. The method of claim 9, wherein the series of light pulses is communicated by the optical mouse to the computer system as horizontal motion pulses.

12. The method of claim 8, wherein the password is communicated to the optical mouse from the password generator as a series vibrations.

13. The method of claim 12, wherein the password generator is configured to produce the series of vibrations with a vibration motor.

14. The method of claim 8, further comprising activating the optical mouse prior to communicating the password to the optical mouse.

15. The method of claim 14, wherein the optical mouse is activated by transmitting an optical activation pulse from the password generator to the optical mouse.

16. The method of claim 14, wherein the optical mouse is activated with a vibration at the surface of the password generator.

17. A password generator, comprising:
   a communication surface;
   a processor coupled configured to generate password data; and
   a transmitter configured to transmit data associated with the generated password data as mouse movement data to an optical sensor of a computer mouse situated at communication surface.

18. The password generator of claim 17, wherein the processor is configured to produce a mouse activation sequence, and the transmitter is configured to transmit the mouse activation sequence.

19. The password generator of claim 17, further comprising a light emitter, wherein the transmitter is coupled to the light emitter so as to transmit the password as a series of light pulses.

20. The password generator of claim 17, further comprising a vibration motor, wherein the transmitter is coupled to the vibration motor so as to transmit the password as a series of vibrations.

21. The password generator of claim 17, wherein the communication surface is a surface of a card, a stick, or a fob.

* * * * *